United States Patent [19]

Ishida et al.

[11] Patent Number: 4,482,135
[45] Date of Patent: Nov. 13, 1984

[54] MACPHERSON STRUT FRONT SUSPENSION

[75] Inventors: Takashi Ishida; Kazutaka Hamada, both of Yokohama, Japan

[73] Assignee: Nissan Motor Company, Limited, Yokohama, Japan

[21] Appl. No.: 402,765

[22] Filed: Jul. 28, 1982

[30] Foreign Application Priority Data

Jul. 30, 1981 [JP] Japan .................. 56-119664

[51] Int. Cl.³ .............. B60G 15/06; F16F 3/08; F16F 9/54
[52] U.S. Cl. .................. 267/8 R; 267/33; 267/152; 280/668
[58] Field of Search .......... 267/8 R, 8 B, 33, 35, 267/63 A, 151, 152, 153, 8 C, 8 D, 8 A, 9 R, 9 B, 9 A, 9 C, 10; 188/297, 321.11, 322.12, 322.19, 322.22; 280/668, 696

[56] References Cited

U.S. PATENT DOCUMENTS

| 3,417,986 | 12/1968 | Fuke ........................... 267/33 |
| 4,175,771 | 11/1979 | Muzechuk et al. ........... 267/8 R |
| 4,206,907 | 6/1980 | Harrod ........................ 267/8 R |
| 4,249,645 | 2/1981 | Level et al. ................ 188/322.12 |
| 4,434,977 | 3/1984 | Chiba et al. .................. 267/33 |

FOREIGN PATENT DOCUMENTS

| 2658835 | 6/1978 | Fed. Rep. of Germany ................ 188/321.11 |
| 2713133 | 10/1978 | Fed. Rep. of Germany ................ 188/321.11 |
| 2820585 | 11/1979 | Fed. Rep. of Germany . |
| 2834528 | 2/1980 | Fed. Rep. of Germany ...... 280/668 |
| 3014869 | 11/1980 | Fed. Rep. of Germany . |
| 2401787 | 3/1979 | France . |

Primary Examiner—Douglas C. Butler
Assistant Examiner—R. R. Diefendorf
Attorney, Agent, or Firm—Schwartz, Jeffery, Schwaab, Mack, Blumenthal & Koch

[57] ABSTRACT

A MacPherson strut front suspension is provided with an upper spring seat assembly which retains the upper end of a front coil spring and is rotatable together with the coil spring and a strut outer tube relative to a vehicle body. The upper spring seat assembly comprises concentric inner and outer tubular members, a spring seat rubber interconnecting the inner and outer tubular members, and a shallow dish-shaped abutment member which is attached to the inner tubular member to be rotatable together therewith and abuttingly engageable to limit upward movement of the outer tubular member relative to the inner tubular member.

8 Claims, 9 Drawing Figures

FIG. 2 PRIOR ART
FIG. 1
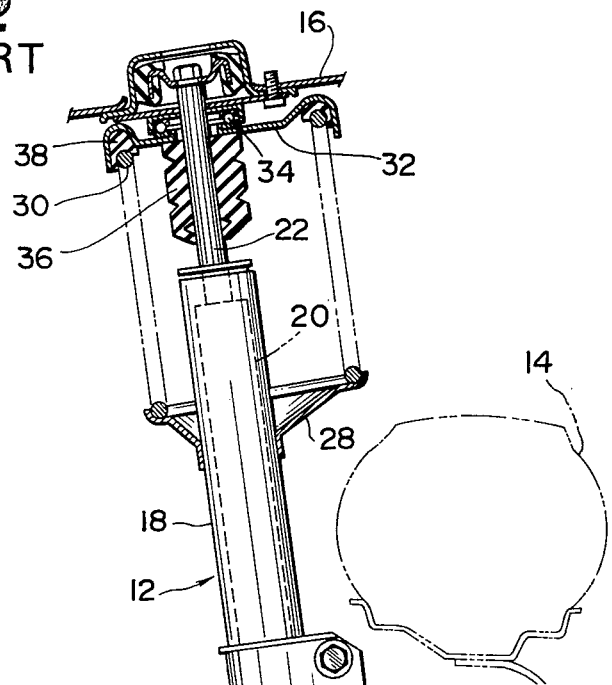
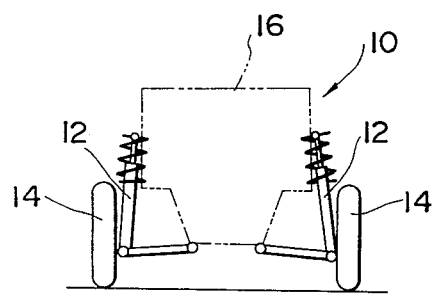

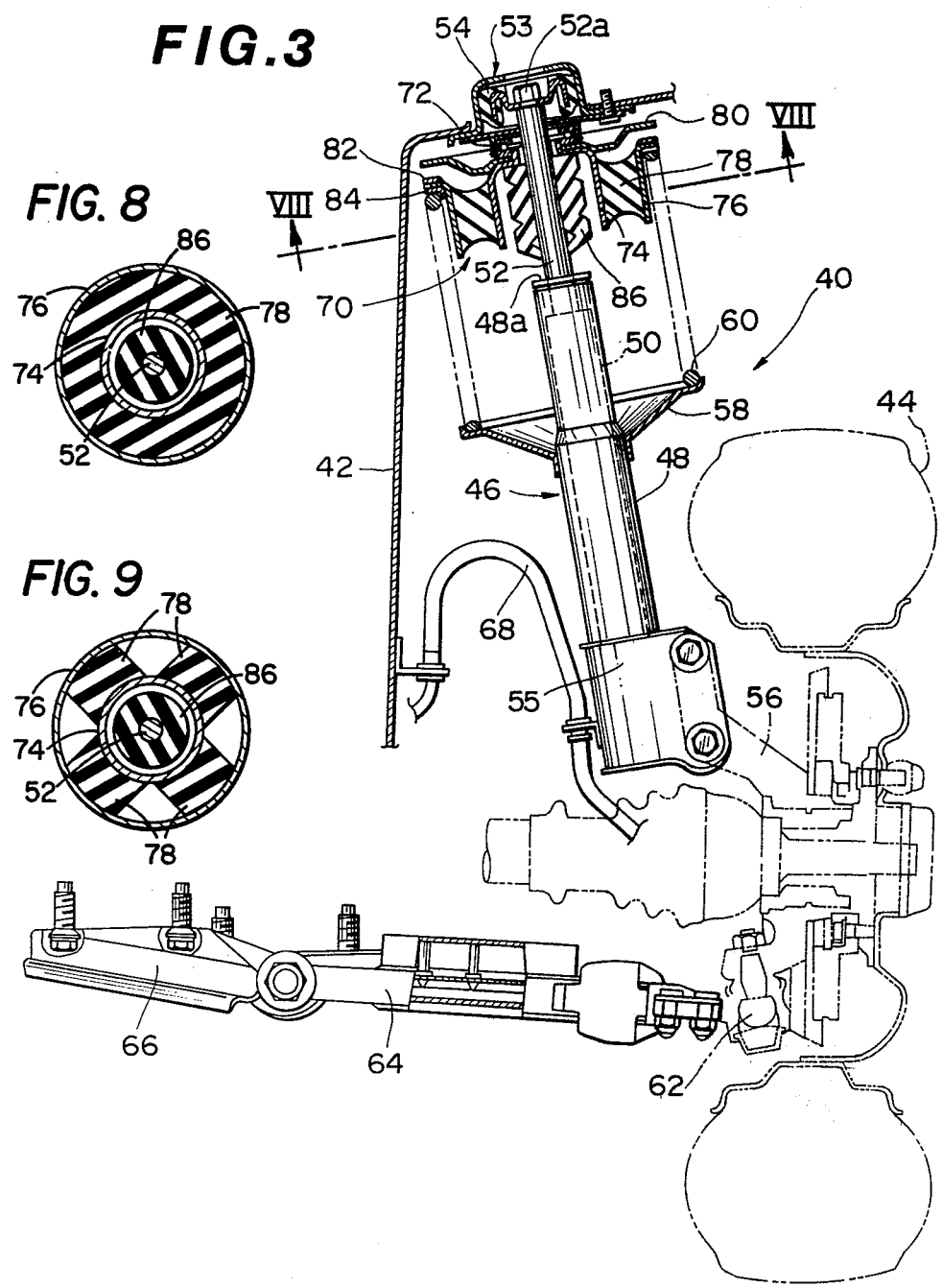
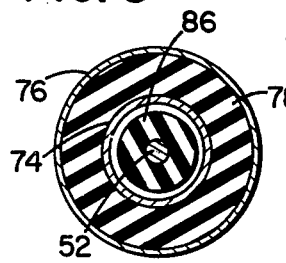
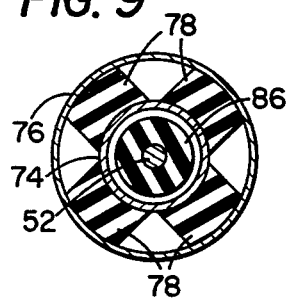
FIG.3
FIG.8
FIG.9

MACPHERSON STRUT FRONT SUSPENSION

BACKGROUND OF THE INVENTION

1. Field of the Invention

The present invention relates to improvements in MacPherson strut suspension for automotive vehicle steering road wheels, i.e., front wheels.

2. Description of the Prior Art

MacPherson strut suspension is well known in the art and used in many small passenger cars. A typical example of MacPherson strut suspension is shown in FIGS. 1 and 2. Referring to the drawings, the MacPherson strut suspension is generally indicated at 10 and includes two upright strut assemblies 12 interconnecting front wheels 14 and a vehicle body 16. As shown in FIG. 2, each strut assembly 12 has an outer tube 18 and a shock absorber 20 fixedly received therein. The shock absorber 20 has a piston rod 22 projecting upwardly from the upper end of the strut outer tube 18 to be pivotally and resiliently connected to the vehicle body 16. The strut assembly 12 also has a bracket 24 secured to the lower end of the strut outer tube 18 for supporting a steering knuckle 26. Also secured to the strut outer tube 18 is a lower spring seat 28 for retaining the lower end of a front coil spring 30 placed around the piston rod 22 and the strut outer tube 18. The upper end of the front coil spring 30 is retained by an upper spring seat 32 which has an opening permitting the piston rod 22 to extend upwardly therethrough and is urged by the front coil spring 30 against the vehicle body 16 by interposing therebetween a bearing 34 so that the upper spring seat 32 is rotatable relative to the vehicle body 16. Mounted on the piston rod 22 at a location between the upper spring seat 32 and the upper end of the strut outer tube 18 is a bumper rubber 36 adapted to function as a damper for large shocks. The front wheel 14 is thus turnable about the center axis of the strut assembly 12 together with the strut outer tube 18, the coil spring 30 and so on.

In the above described front suspension, there is provided between the front coil spring 30 and the upper spring seat 32 a spring seat rubber 38 for insulation therebetween. The spring seat rubber 38 has a spring constant which sharply increases with increasing compression force applied thereto. When installed in place, the spring seat rubber 38 is subjected to a relatively large pre-load from the front coil spring 30 and thus given a large spring constant. Such spring seat rubber 38, therefore, cannot sufficiently insulate the vehicle body from shocks, particularly from small vibrations but allows the small vibrations to be transferred through the bearing 34 to the vehicle body 16. The above described MacPherson strut suspension thus has the drawback that it cannot effectively insulate the vehicle body 16 from shocks, particularly from small vibrations, resulting in a deteriorated ride quality. In order to overcome this drawback, the spring seat rubber 38 may be increased in solid thickness or height. This, however, results in another problem of an increased vehicle height.

SUMMARY OF THE INVENTION

In accordance with the present invention, there is provided a MacPherson strut suspension comprising: an upright strut assembly having a strut outer tube and a shock absorber received therein, the strut outer tube being adapted to carry at the lower end thereof a steering road wheel, the shock absorber having a piston rod projecting upwardly from the upper end of the strut outer tube to be resiliently and pivotally connected to a vehicle body; a coil spring placed around the strut outer tube and the piston rod; a lower spring seat secured to the strut outer tube and retaining the lower end of the coil spring; and an upper spring seat assembly having concentric inner and outer tubular members, the inner tubular member being rotatably mounted to the vehicle body, the outer tubular member being adapted to retain the upper end of the coil spring, the upper spring seat assembly also having a spring seat resilient member resiliently interconnecting the inner and outer tubular members and an abutment member attached to the inner tubular member to rotate together therewith and engagable with the outer tubular member to limit the extent of upward movement of same relative to the inner tubular member, the inner tubular member being in the form of having a tubular wall portion and an annular inward flange portion at the upper end of the tubular wall portion thereof, the inner tubular member being mounted at the annular inward flange portion thereof on a bearing which is in turn mounted on the vehicle body.

This structure enables the MacPherson strut suspension to overcome the drawbacks noted above. That is, the upper spring seat assembly is constructed and arranged so that the spring seat resilient member is subjected to shearing force and therefore to shearing deformation. Such shearing type spring seat resilient member can attain a smaller spring constant as compared with the "compression" type spring seat rubber in the prior art suspension. The spring seat resilient member can thus effectively absorb shocks from the coil spring, particularly small vibrations, enabling the MacPherson strut suspension to have improved and excellent shock absorbing characteristics and thereby to provide improved riding comfort.

It is accordingly an object of the present invention to provide a novel and improved MacPherson strut front suspension which is free from the drawbacks noted above.

It is another object of the present invention to provide a novel and improved MacPherson strut front suspension of the above described character which can effectively absorb small vibrations as well as large shocks.

It is a further object of the present invention to provide a novel and improved MacPherson strut front suspension of the above described character which provides an assured safety of driving.

BRIEF DESCRIPTION OF THE DRAWINGS

The features and advantages of the MacPherson strut front suspension according to the present invention will become more clearly appreciated from the following description taken in conjunction with the accompanying drawings, in which:

FIG. 1 is a schematic view of a MacPherson strut front suspension to which the present invention is applied;

FIG. 2 is a sectional view of a prior art MacPherson strut front suspension;

FIG. 3 is a sectional view of a MacPherson strut front suspension according to the present invention;

FIG. 8 is a sectional view taken along the line VIII—VIII of FIG. 3; and

FIG. 9 is a view similar to FIG. 8 but shows a modification of the present invention.

DESCRIPTION OF THE PREFERRED EMBODIMENT

Figure 4:
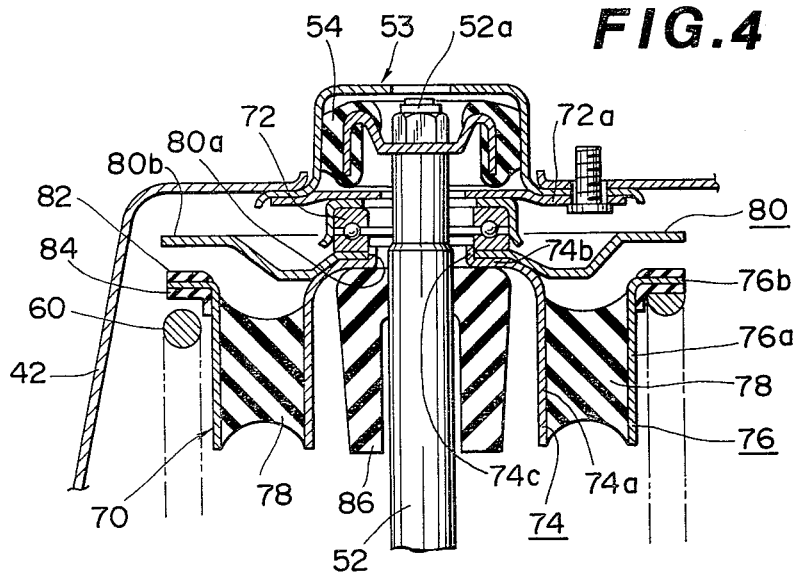
FIG. 4 is an enlarged, sectional view of the MacPherson strut front suspension of FIG. 3, with parts and portions being omitted.

Referring now to FIGS. 3 to 7, inclusive, a MacPherson strut suspension according to the present invention is generally indicated at 40 and adapted to suspend a vehicle body 42 above steering road wheels, i.e., front wheels 44, though only one front wheel and an associated half part of the suspension 40 are illustrated. The MacPherson strut suspension 40 comprises two upright strut assemblies 46 interconnecting the vehicle body 42 and the front wheels 44. Each strut assembly 46 has an outer tube 48 and a shock absorber 50 fixedly received therein. The shock absorber 50 has a piston rod 52 projecting upwardly from the upper end 48a of the strut outer tube 48 to terminate at an end 52a pivotally and resiliently connected to the vehicle body 42 by means of a mounting unit 53 including a mounting insulator 54. A bracket 55 is secured to the lower end of the strut outer tube 48. The bracket 55 supports a steering knuckle 56 on which the front wheel 44 is carried. The front wheel 44 is thus adapted to be turnable about the center axis of the strut outer tube 48 together with same. A lower spring seat 58 is also secured to the strut outer tube 48 and retains the lower end of a front coil spring 60 which is placed around the piston rod 52 and the strut outer tube 48. The steering knuckle 56 is connected at its lower end portion to a transverse link 64 by means of a ball joint 62. The transverse link 64 is in turn connected through a transverse link gusset 66 to the vehicle body 42. The transverse link 64 and link gusset 66 are arranged to lie on a substantially horizontal plane and extend transversely of the vehicle body 16, constituting a so-called lower control arm. The strut outer tube 48 is also adapted to support at the lower end thereof a brake hose 68 in communication with a wheel cylinder (not shown). The brake hose 68 is made of a resilient material so that it is resiliently deformable when the front wheel 44 is steered or turned about the center axis of the strut assembly 46.

The above structure substantially follows the conventional fashion. In accordance with the present invention, the upper end of the front coil spring 60 is retained by an upper spring seat assembly 70 which is placed around the piston rod 52 and rotatably mounted to the vehicle body 42 by interposing a bearing 72 between the vehicle body 42 and the spring seat assembly 70. The spring seat assembly 70 includes concentric inner and outer tubular members 74 and 76, an annular spring seat rubber 78 interconnecting the inner and outer tubular members 74 and 76, and a shallow dish-like abutment member 80 attached to the upper end of the inner tubular member 74 and engagable with the upper end of the outer tubular member 76 to limit the extent of upward movement of the outer tubular member 76 relative to the inner tubular member 74.

More specifically, the inner tubular member 74 has a tubular wall portion 74a and an annular inward flange portion 74b extending radially inwardly from the upper end of the tubular wall portion 74a. The inner tubular member 74 is carried at the inward flange portion 74b on the bearing 72 by interposing the abutment member 80 between the inward flange portion 74b and the bearing 72. The bearing 72 is mounted on the vehicle body 42 by means of a bearing retainer 72a. The inward flange portion 74b has at the inner periphery thereof a circular projection 74c in the form of a bent edge which is adapted to serve as a location means for positioning the abutment member 80 in relation to the inner tubular member 74 and also for positioning the inner tubular member 74 itself in relation to the bearing 72.

The outer tubular member 76 has a tubular wall portion 76a and an annular outward flange portion 76b extending radially outwardly from the upper end of the tubular wall portion 76a. The front coil spring 60 is in part placed around the tubular wall portion 76a and has an upper end seated on the outward flange portion 76b.

The inner and outer tubular members 74 and 76 are concentrically arranged to provide an annular space between the tubular wall portions 74a and 76a. The spring seat rubber 78 is fitted in the annular space and vulcanized between or otherwise bonded at the respective inner and outer circumferential walls thereof to the tubular wall portions 74a and 76a for thereby resiliently interconnecting same. The spring seat rubber 78 is a single piece of annular configuration as shown in FIG. 8 but may otherwise be formed from a plurality of separate piece which are fitted in the foregoing annular space at equal spaces and bonded to the tubular wall portions 74a and 76a, that is, the separate pieces are arranged in a circular array at equal spaces and resiliently interconnect the inner and outer tubular members 74 and 76 as shown in FIG. 9.

The abutment member 80 is in the form of a shallow dish and has a central opening 80a receiving therein the circular projection 74c of the inner tubular member 74. The abutment member 80 is firmly clamped at a portion thereof around the central opening 80a between the inward flange portion 74b of the inner tubular member 74 and the bearing 72 due to the bias of the front spring 60. The abutment member 80 further has an annular flat abutment wall portion 80b which is located above the outward flange portion 76b of the outer tubular member 76 and normally spaced therefrom a predetermined distance for allowing the spring seat rubber 78 to deform elastically while absorbing shocks, particularly small vibrations. When, however, the spring seat rubber 78 is subjected to a large shock and deformed largely, the outward flange portion 76b of the outer tubular member 76 is abuttingly engaged with the abutment wall portion 80b of the abutment member 80 and prevented from being displaced further upwardly relative to the inner tubular member 74, thereby preventing the spring seat rubber 78 from being deformed excessively. The abutment member 80 is shaped to have an outer diameter substantially the same as that of the outward flange portion 76b of the outer tubular member 76.

The outward flange portion 76b of the outer tubular member 76 has at the upper surface thereof a first flange rubber 82 which is bonded or otherwise secured to the flange portion 76b for absorbing or dampening shocks which are caused when the flange portion 76b strikes against the abutment wall portion 80b of the abutment member 80. The outward flange portion 76b further has at the lower surface thereof a second flange rubber 84 which is bonded or otherwise secured to the flange portion 76b for insulation between the upper end of the front spring 60 and the outward flange portion 76b of the outer tubular member 76. When the outer tubular member 76 is brought into contact with the abutment member 80, the first and second flange rubbers 82 and 84 thus serve as a damper or insulator between the upper spring seat assembly 70 and the front spring 60.

Similarly to the prior art structure, a bumper rubber 86 is mounted on the piston rod 52 at a location between the upper end of the strut outer tube 48 and the upper spring seat assembly 70. The bumper rubber 86 is attached at the upper end thereof to the inward flange portion 74b of the inner tubular member 74 and adapted to be compressed between the flange portion 74b and the upper end of the strut outer tube 48 to function as a damper for shocks, particularly for large shocks.

With the foregoing structure, improved and excellent shock absorbing characteristics can be attained. That is, in accordance with the present invention, it is so constructed and arranged that the spring seat rubber 78 of the spring seat assembly 70 is subjected to shearing force and therefore to shearing deformation. Such "shearing" type spring seat rubber 78 can attain a smaller spring constant as compared with the "compression" type spring seat rubber in the prior art suspension. The thickness or height of the spring seat rubber 78 can be designed freely depending upon a desired spring constant since the height of the spring seat rubber 78 can be increased without increasing the height of the strut assembly 46 and therefore the vehicle height. The spring seat rubber 78 can thus effectively absorb shocks from the front coil spring 60, particularly small vibrations and effectively prevent the transfer of such vibrations to the vehicle body 42. The MacPherson strut front suspension of the present invention is therefore quite effective for improving riding comfort.

It is also to be noted that the abutment member 80 is effective for prolonged life of the spring seat rubber 78 since it is operative to abuttingly engage the outer tubular member 76 for thereby preventing the spring seat rubber 78 from being deformed excessively. The abutment member 80 is further effective for providing an assured safety of driving since if the spring seat rubber 78 should have cracks or be broken into pieces due to repeated shearing forces applied thereto and become unable to resiliently interconnect the inner and outer tubular members 74 and 76, the abutment member 80 would receive thereon the outer tubular member 76 and allow the front coil spring 60 to rotate together with the strut outer 48 when the front wheel 44 is steered or turned. Without this abutment member 80, the upper end of the front coil spring 60 would be brought into direct engagement with the vehicle body 42, disabling the steering of the front wheel 44 since the front coil spring 60 and the strut outer tube 48 are lockingly engaged with the vehicle body 42 and not rotatable. In the case when the upper end of the front coil spring 60 is kept engaged with the abutment member 80 by interposing therebetween the flange portion 76b of the outer tubular member 76, the first and second flange rubbers 82 and 84 come to serve as a shock absorber for reducing the transfer of shocks to the vehicle body, enabling the suspension 40 to still effect a shock absorbing action which is no less efficient than the comparable prior art suspension of the described type.

Figure 5:
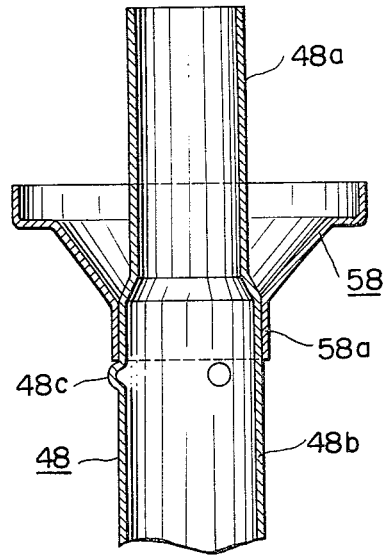
FIG. 5 is an enlarged sectional view of a strut outer tube and a lower spring seat utilized in the MacPherson strut front suspension of FIG. 3.

FIG. 5 shows the details of the strut outer tube 48 and the lower spring seat 58. The strut outer tube 48 is shaped to have an upper small diameter portion 48a and a lower large diameter portion 48b. The lower spring seat 58 has a circular neck portion 58a which is fitted on the lower large diameter portion 48b of the strut outer tube 48 at a location adjacent the upper end of the lower large diameter portion 48b. In order to facilitate positioning of the lower spring seat 58 in relation to the strut outer tube 48, the lower large diameter portion of the strut outer tube 48 is formed with a plurality of projections 48c. This is quite effective for reducing the manufacturing and assembling expense.

Figure 6:
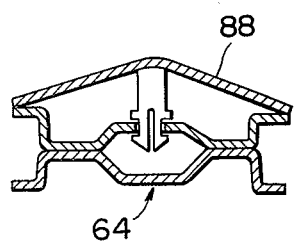
FIG. 6 is an enlarged sectional view of a transverse link utilized in the MacPherson strut front suspension of FIG. 3.

FIG. 6 shows the cross section of the transverse link 64. As seen from the drawing, a roof-like cover 88 is attached to the transverse link 64 to cover the upper face thereof for thereby preventing snow, pebbles or the like from being collected on the transverse link 64.

Figure 7:
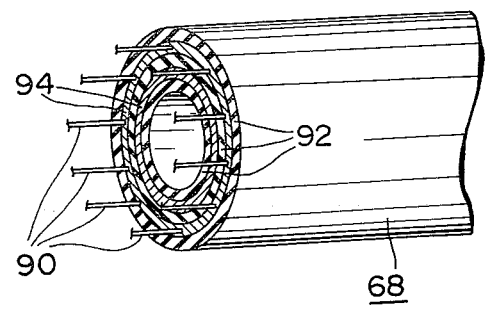
FIG. 7 is an enlarged, partly sectional, perspective view of a front brake hose associated with the MacPherson strut front suspension of FIG. 3.

FIG. 7 shows the details of the brake hose 68 which is adapted to have built-in heaters 90. That is, the brake hose 68 is generally formed from a resilient layer 92 made of rubber or the like and a fibre-reinforced layer 94 to have a sufficient flexibility. When, however, used in a severely cold district, the brake hose 68 becomes quite hard and has a possibility of being cracked when subjected to bending. In order to overcome this deffect, the fibre-reinforced layer 94 is adapted to accommodate the built-in heaters 90 which are formed from electric heating wire and adapted to generate heat when the temperature falls below a predetermined value. When this, the brake hose 68 can retain a sufficient flexibility even when used in a severely cold district.

Obviously, many variations and modifications of the present invention are possible in light of the above teachings. It is, therefore, to be understood that within the scope of the appended claims, the invention may be practiced otherwise than as specifically described.

What is claimed is:

1. A MacPherson strut suspension comprising:

an upright strut assembly having a strut outer tube and a shock absorber received therein, said strut outer tube being adapted to carry at the lower end thereof a steering road wheel, said shock absorber having a piston rod projecting upwardly from the upper end of said strut outer tube to be resiliently and pivotally connected to a vehicle body;

a coil spring placed around said strut outer tube and said piston rod;

a lower spring seat secured to said strut outer tube and retaining the lower end of said coil spring; and an upper spring seat assembly having concentric inner and outer tubular members, said inner tubular member being rotatably mounted to the vehicle body, said outer tubular member being adapted to retain the upper end of said coil spring, said upper spring seat assembly also having a spring seat resilient member resiliently interconnecting said inner and outer tubular members and an abutment member attached to said inner tubular member to rotate together therewith and engagable with said outer tubular member to limit upward movement of same relative to said inner tubular member, said inner tubular member being in the form of having a tubular wall portion and an annular inward flange portion at the upper end of said tubular wall portion thereof, said inner tubular member being mounted at said annular inward flange portion thereof on a bearing which is in turn mounted on the vehicle body.

2. A MacPherson strut suspension as set forth in claim 1, wherein said annular inward flange portion has at the inner periphery thereof a circular projection in the form of a bent edge, said circular projection being operative to position said inner tubular member in relation to said bearing.

3. A MacPherson strut suspension as set forth in claim 2, wherein said outer tubular member is in the form of having a tubular wall portion which cooperates with said tubular wall portion of said inner tubular member to define therebetween an annular space, and also having at the upper end of said tubular wall portion thereof an annular outward flange portion which forms a seat on which the upper end of said coil spring is seated.

4. A MacPherson strut suspension as set forth in claim 3, wherein said spring seat resilient member is a single piece rubber of annular configuration, said spring seat resilient member being fitted in said annular space and secured at the respective inner and outer circumferential walls thereof to said tubular wall portions of said inner and outer tubular members.

5. A MacPherson strut suspension as set forth in claim 5, wherein said spring seat resilient member is formed from a plurality of separate pieces of rubber which are fitted in said annular space at equal spaces and secured to said tubular wall portions of said inner and outer tubular members.

6. A MacPherson strut suspension as set forth in claim 4 or 5, wherein said abutment member is in the form of a shallow dish and has a central opening for engagement with said circular projection which is further operative to position said abutment member in relation to said inner tubular member, said abutment member being firmly clamped at a portion thereof around said central opening between said annular inward flange of said inner tubular member and said bearing, said abutment member further having an annular flat abutment wall portion which is located above said outward flange portion of said outer tubular member and spaced therefrom a predetermined distance for limitedly allowing said spring seat rubber to deform elastically.

7. A MacPherson strut suspension as set forth in claim 6, further comprising first and second flange rubber members which are respectively attached to the upper and lower faces of said outward flange portion of said outer tubular member, said first flange rubber being operative to provide insulation between said outer tubular member and said abutment member, said second flange rubber being operative to provide insulation between the upper end of said coil spring and said outward flange portion of said outer tubular member.

8. A MacPherson strut suspension as set forth in claim 7, further comprising a bumper rubber mounted on said piston rod at a location between the upper end of said strut outer tube and said inward flange portion of said inner tubular member.

* * * * *